Feb. 16, 1960     D. A. HALL     2,925,008
SYSTEM FOR SYNCHRONIZING AN EVENT WITH A CAMERA
Filed Jan. 20, 1958
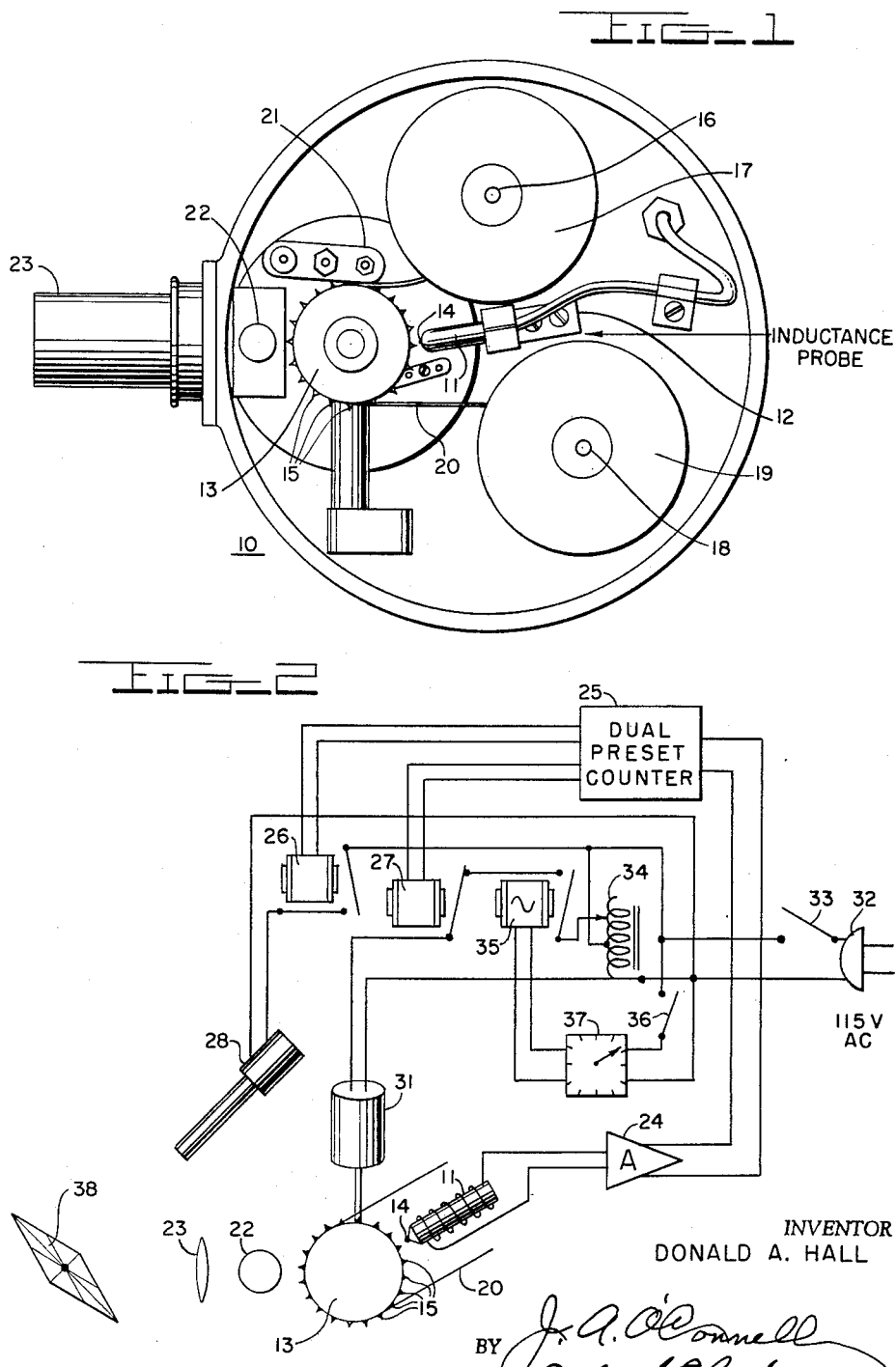
INVENTOR
DONALD A. HALL

United States Patent Office 2,925,008
Patented Feb. 16, 1960

2,925,008

SYSTEM FOR SYNCHRONIZING AN EVENT WITH A CAMERA

Donald A. Hall, Annapolis, Md., assignor to the United States of America as represented by the Secretary of the Navy Application January 20, 1958, Serial No. 710,167

5 Claims. (Cl. 88—16)

(Granted under Title 35, U.S. Code (1952), sec. 266)

The invention described herein may be manufactured and used by or for the Government of the United States of America for governmental purposes without the payment of any royalties thereon or therefor.

The present invention relates to high speed motion picture cameras and more particularly to a system and method of synchronizing a precise location or point on the film with an event to be filmed by the camera.

Development of motion picture cameras capable of framing rates as high as 18 thousand per second has made it possible to obtain motion analysis for transient phenomena of less than one-millisecond duration. Due to the time required for the motor to reach maximum speed and the short time required to expend the film, rather exact timing is required to effect coincidence of the desired event with the highest available framing speed. Heretofore, synchronization of such phenomena with very high framing speed cameras has been undertaken by estimating the time interval between the instant power is applied and the instant at which the framing rate is at approximately a maximum. The estimate is made from the average characteristics of the camera, and the event to be photographed is set to be triggered at the maximum framing speed by a timing device. Because of local variations in camera operation conditions, the estimate is somewhat uncertain, therefore, the time interval must be estimated conservatively, oftentimes, resulting in undesirable recording of events or no recording at all. A certain period of time is required to reach maximum speed from the motor of a high speed camera (18,000 per second); therefore, if it is desired to record an event at the highest speed, it is essential that the run-off of a film be gauged such that the event can be triggered in time to record the event at a desired point along the film.

The present invention overcomes the above short comings and provides an effective inexpensive means for synchronizing a high speed camera with an event to be photographed. The device includes an inductance probe secured in registry with the teeth on the film driving sprocket and electrically connected to a counter. The counter registers the number of teeth that pass the inductance probe and controls a set of relays according to a predetermined setting of the counter. One relay triggers the event and another relay stops the motor of the camera a definite number of cycles after the event has occurred.

It is therefore an object of the present invention to provide a system which can be synchronized with a camera to photograph an event at a definite time.

Another object is to provide a system in which an event can be recorded photographically in coincidence with the highest framing speeds of a camera.

Still another object is to provide a means wherein an event is controlled by operation of the camera which is to photograph the event.

Yet another object is to provide a system which will record an event along a definite portion of the film.

A further object is to record an event at a given point along the film which is independent of the time required to reach the point.

The exact nature of this invention as well as other objects and advantages thereof will be readily apparent from consideration of the following specification relating to the annexed drawings, in which:

Fig. 1 is a partial side view of a camera illustrating the relationship of the inductance probe to the driving sprocket; and Fig. 2 illustrates a schematic diagram of the system and components of the assembly in the synchronized system.

In accordance with the present invention, an electronic event synchronizer for high speed framing cameras is provided for photographing events of short duration about one millisecond. A preferred embodiment comprises a variable inductance probe, a preamplifier, a dual preset electronic counter and a pair of relays for controling the power to the camera motor and for triggering the event. The probe is secured adjacent to the film-driving sprocket wheel of a camera such that the probe detects the passage of each tooth on the sprocket and sends a signal to the preamplifier. The preamplifier feeds the signals to the dual preset counter which counts the number of sprocket teeth that pass the probe. After a predetermined number of sprocket teeth have passed the probe, which represents a certain length of film run-off, the counter closes a normally open relay to trigger the event. Continued operation of the camera will be indicated or counted by the counter and after a predetermined count, the counter operates a normally closed relay to break the circuit to the camera motor thereby stopping the motor and preventing damage to the end of the film. A camera operated according to the present invention is not dependent on the time of operation but on the number of sprocket teeth that pass the probe; therefore, the initiation of an event can be photographed at a specific place along the film length which will ultimately result in a need to develop only that portion of the film upon which the event has been recorded whereby the unexposed portion may be reused. Such a recording of events can be carried out by using a film with a long leader attached to a film upon which the event is to be recorded thereby making a saving on the expensive film and permitting the camera to reach high framing speeds before the event is triggered.

Referring now to the drawings there is shown by illustration in Fig. 1 a typical camera such as a Wollensak Fastax camera 10, Model No. WFI, of standard design and capable of framing speeds of 18,000 per second and a pulse induction probe 11, manufactured by Edgerton Germeshausen and Grier, secured to the inner surface of the camera by a clamp 12. The probe is positioned adjacent to the film-driving sprocket wheel 13 with the end 14 of the probe placed in direct alignment with the steel teeth 15 of the sprocket wheel. The camera may be of standard design and includes all of the other pertinent features without modification, such as the feed spindle 16, supply spool 17, take-up spindle 18, take-up spool 19, a film 20, the film hold down roller 21, a prism housing 22 and the lens 23. The operation of the camera has not been altered and the camera has not been modified in structure except to include the probe positioned adjacent to the film-driving sprocket wheel.

Fig. 2 illustrates a schematic diagram of the components assembly in the synchronization system which includes the film-driving sprocket wheel 13 and the adjacent probe 11 positioned in direct alignment with the teeth 15 on the wheel. The probe is electrically connected to a pulse amplifier 24 of any well known type which amplifies the pulses received from the probe 11. The amplifier is connected with a dual preset counter 25, such as a Berkeley Model 5445A manufactured by Beckman Instruments Inc., Richmond, California, which counts the number of sprocket teeth that passes the probe 11 according to the pulses produced by the probe. The dual preset counter 25 controls two fast action relays such as a normally open relay 26 that operates to trigger an event such as a gun 28 and a normally closed relay 27 which controls the camera motor 31. The camera motor draws a current of 11 amperes during operation and the above identified counter is normally made with relays operable at 5 amperes therefore relays 26 and 27 are of any suitable heavy duty type such as described in Allen Bradley Bulletin X89309. An alternating current power supply 32 of 120 volts is controlled by a master switch 33 and fed into an auto-transformer 34 which supplies current to the camera motor through a normally open relay 35. The current is further controlled by the normally closed relay 27 which is controlled by a circuit from one section of the dual counter 25 connected across the coil of the relay 27. The coil of the normally open relay 35 is energized by a circuit from the power supply 32 and the power is controlled by a manually operated switch 36.

For cameras lacking an automatic motor cut-off device, a timer unit 37 can be placed in the circuit to relay 35 to de-energize the relay in case the counter fails to de-energize the relay 27.

Subsequent to operation of the device, the dual preset counter must be set in order to record the event at a definite place along the film. For the purpose of setting the counter, the position along the film required to record the event must be determined in accordance to whether or not maximum camera speed is required. As an example, it will be assumed that maximum camera speed is required and the event will be recorded near the end of a 110 foot film with photographing of the event to take place at approximately 100 feet. The wheel of the illustrated camera has 20 sprockets or teeth thereon which for 16 mm. film requires two revolutions of the sprocket wheel to feed one foot of film past the camera lens. Thus the film has 40 perforations per foot and records 40 frames per foot; therefore, the number of teeth to pass the probe for a 100 foot run will be 40 times 100 or 4000 counts. The preset counter that controls the relay to the event will be set at 4000 counts. The other setting of the counter of the dual counter that controls the camera motor will be set at 4400 to stop the camera motor at the end of the film run since there will be 10 feet to run after the event is triggered by relay 26.

In operation of the device, the dual preset counter is set at the proper counts to control the relay to the event and to subsequently control the motor cut-off. The timer 37 that controls the relay 35 is set at a cut-off time which is greater than the time required for the counter to operate the camera motor cut-off relay 27. After having set the preset counter and the timer, the main switch 33 and switch 36 are closed. Switch 33 supplies current from the current source 32 to the auto-transformer 34 and through proper circuitry to the control elements for the camera motor and the gun 28. When switch 36 is closed, current flows through the timer control to the coil of relay 35 to energize the coil of the relay. The coil closes the normally open contacts of the relay to supply current through normally closed relay 27 on to the camera motor thereby starting operation of the camera motor 31. The camera motor operates the camera in the normal manner rotating the film-driving sprocket wheel 13 to feed the film 20 from the supply spool 17 onto the take-up spool 19. The inductance probe consists of a coil wound on a permanently magnetized core which is pointed on the end 14 positioned adjacent to the teeth of the sprocket wheel 13. As each tooth on the sprocket wheel passes the end of the probe, the magnetic flux through the coil is rapidly changed and a voltage impulse is obtained from the coil. These pulses are fed into and amplified by the amplifier and recorded by the dual preset counter. After 4000 counts as described above or any other preset number of counts has been recorded by the counter, one section of the counter will energize the coil of relay 26 to close the circuit from the power source to the gun or event. The gun fires a projectile into the target 38 and the camera photographs the event that takes place at the time the projectile hits the target. At the end of the film run, the preset counter energizes the coil of relay 27 to open the circuit to the camera motor thereby stopping the operation of the camera. If, by chance, the coil of relay 27 is not energized by the counter, then the timer 37 will open the circuit to the relay 35 which subsequently opens the circuit from the auto-transformer to the camera motor. The master switch 33 is then opened and the power supply to the system is broken.

The Fastax camera illustrated operates at 280 volts which requires a variable transformer for operation by a power supply of 120 volts; however, it is obvious that other cameras may be operated with 120 volts which would not require a transformer. In the latter case, the power supply may be fed directly to the relay 35 for satisfactory operation of the system.

Once the dual preset counter has been set for a particular event, the only requirement for operation will be, to load the camera, set the timer, and close switches 33 and 36 after the power supply line has been plugged into the power supply. Synchronization of an event with a definite point on the film can be carried out with any speed camera by setting the dual preset counter as above described. Since triggering of the event is dependent on the number of pulses produced by operation of the camera, it is the speed of the camera that determines the event rather than the time of operation; therefore, the event is not dependent on the time of operation.

Obviously many modifications and variations of the present invention are possible in the light of the above teachings. It is therefore to be understood that within the scope of the appended claims the invention may be practiced otherwise than as specifically described.

What is claimed is:

1. Apparatus for controlling an event by operation of a camera which comprises a film-driving means, means responsive to said film-driving means for detecting an advancement of each frame of a film adapted to be driven by said film-driving means, means connected with said means responsive to said film-driving means for counting each frame advancement of said film, and means responsive to said counting means for triggering an event according to a predetermined setting of said counting means depending on the number of frames detected.

2. Apparatus for controlling an event by operation of a normally operated camera which comprises a film-driving means, a voltage impulse means positioned adjacent to said film-driving means, said voltage impulse means being responsive to said film-driving means to produce an electric pulse for each movement of said film-driving means, counting means connected with said voltage impulse means which counts each of said electric pulses, and means operative by said counting means according to a predetermined setting of said counting means adapted to trigger said event.

3. Apparatus for controlling an event by operation of a normally operated camera which comprises a film-driving sprocket wheel adapted to drive a perforated film, said sprocket wheel having teeth thereon that match said perforations, an inductance probe positioned with an end adjacent to and in alignment with said sprocket teeth, said inductance probe adapted to produce an electric pulse as each of said teeth pass said adjacent end of said probe to represent a movement of said film through one frame, an amplifier electrically connected with said inductance probe to amplify each of said electric pulses received therefrom, a dual preset counter, said counter being electrically connected with said amplifier for registering each of said pulses, and an event control means electrically connected with said counter, said preset counter adapted to operate said event control means after a preselected pulse count according to the number of frames of said film run-off by the film-drive means.

4. A system for synchronizing an event to be photographed with a particular point along a film of a normally operated camera which comprises a film-driving sprocket wheel, a motor for driving said sprocket wheel, said sprocket wheel having teeth thereon, means positioned adjacent to said teeth, said means adapted to produce an electrical pulse as each of said teeth passes an end thereof, counter means for counting said pulses, said counter adapted to trigger an event at a predetermined pulse count, said counter also adapted to control a switch for said motor after a predetermined count which is greater than said predetermined count for triggering said event.

5. A system for synchronizing an event to be photographed with a particular point along a film of a normally operated camera driven by a film-driving sprocket wheel, said system comprising an inductance probe secured within said camera adjacent to said film-driving sprocket wheel, said probe adapted to produce a pulse for each frame advancement of said film, a dual preset counter connected electrically with said inductance probe for counting said pulses, said counter being operative to trigger an event after a predetermined number of pulses and to subsequently stop said operation after a second predetermined number of pulses.

References Cited in the file of this patent
UNITED STATES PATENTS

| | | |
|---|---|---|
| 2,186,013 | Edgerton | Jan. 9, 1940 |
| 2,473,625 | Wheeler | June 21, 1949 |
| 2,754,721 | Grass | July 17, 1956 |

OTHER REFERENCES

Jones, G. A.: High Speed Photography, published in 1952, by Chapman & Hall, Ltd., London, pages 127–133 cited.